(12) United States Patent
Phillips

(10) Patent No.: US 10,521,101 B2
(45) Date of Patent: Dec. 31, 2019

(54) SCROLL MODE FOR TOUCH/POINTING CONTROL

(71) Applicant: Microsoft Technology Licensing, LLC, Redmond, WA (US)

(72) Inventor: Joseph Benjamin Phillips, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 694 days.

(21) Appl. No.: 15/019,614

(22) Filed: Feb. 9, 2016

(65) Prior Publication Data

US 2017/0228120 A1 Aug. 10, 2017

(51) Int. Cl.
*G06F 3/0485* (2013.01)
*G06F 3/0488* (2013.01)

(52) U.S. Cl.
CPC .......... *G06F 3/0485* (2013.01); *G06F 3/0488* (2013.01); *G06F 3/04883* (2013.01)

(58) Field of Classification Search
CPC .................................................. G06F 3/04847
See application file for complete search history.

(56) References Cited

U.S. PATENT DOCUMENTS

| 7,065,387 | B2 | 6/2006 | Engstrom |
| 8,701,037 | B2 | 4/2014 | Voros et al. |
| 8,830,196 | B2 | 9/2014 | Mizunuma et al. |
| 8,863,040 | B2 * | 10/2014 | Queru ............... B60K 37/06 715/863 |
| 8,984,436 | B1 | 3/2015 | Tseng et al. |
| 9,164,670 | B2 | 10/2015 | Lobo et al. |
| 2003/0043174 | A1 | 3/2003 | Hinckley et al. |
| 2009/0070711 | A1 | 3/2009 | Kwak et al. |
| 2011/0074699 | A1 | 3/2011 | Marr et al. |
| 2012/0042278 | A1 * | 2/2012 | Vaisanen ............... G06F 3/0485 715/786 |
| 2012/0096393 | A1 | 4/2012 | Shim et al. |

(Continued)

FOREIGN PATENT DOCUMENTS

| EP | 1953628 A1 | 8/2008 |
| EP | 2911047 A1 | 8/2015 |
| WO | 2013154341 A1 | 10/2013 |

OTHER PUBLICATIONS

"International Search Report and Written Opinion Issued in PCT Application No. PCT/US2017/015923", dated May 11, 2017, 10 Pages.

(Continued)

*Primary Examiner* — William L Bashore
*Assistant Examiner* — Nathan K Shrewsbury

(57) ABSTRACT

A computing device is described which has a sensor operable to receive user input associated with a display area. The computing device has a renderer operable to render a content item to the display area, the content item having a length and width. The computing device has a processor operable to detect when the user input comprises a scroll mode action and to trigger, in response to the scroll mode action, a scroll mode in which a dimension of the display area is mapped to the length or the width of the content. The scroll mode action comprises a swipe from an edge of the display area in a direction towards the center of the display area.

20 Claims, 8 Drawing Sheets

(56) References Cited

U.S. PATENT DOCUMENTS

| | | | | |
|---|---|---|---|---|
| 2012/0174041 A1* | 7/2012 | Queru | ................... | B60K 37/06 |
| | | | | 715/863 |
| 2012/0240041 A1* | 9/2012 | Lim | ..................... | G06F 3/0485 |
| | | | | 715/702 |
| 2012/0272183 A1 | 10/2012 | Jitkoff et al. | | |
| 2013/0067419 A1* | 3/2013 | Eltoft | ................. | G06F 3/04883 |
| | | | | 715/863 |
| 2013/0152012 A1* | 6/2013 | Jarrett | .................. | G06F 3/0485 |
| | | | | 715/784 |
| 2013/0254705 A1 | 9/2013 | Mooring et al. | | |
| 2013/0342581 A1 | 12/2013 | Gibbs et al. | | |
| 2014/0071074 A1 | 3/2014 | Cousins et al. | | |
| 2014/0137029 A1* | 5/2014 | Stephenson | .......... | G06F 3/0482 |
| | | | | 715/784 |
| 2014/0149922 A1 | 5/2014 | Hauser et al. | | |
| 2015/0033181 A1* | 1/2015 | Mizunuma | .............. | G06F 1/169 |
| | | | | 715/784 |
| 2016/0202868 A1* | 7/2016 | Parker | .................. | G06F 3/0483 |
| | | | | 715/769 |
| 2017/0108936 A1* | 4/2017 | Feinstein | ............. | G06F 3/0485 |

OTHER PUBLICATIONS

Palladino, Valentina, "Apple Nudge Gestures Could Change How We Control iPhones", Published on: Jul. 21, 2015, 8 pages, Available at: http://www.tomsguide.com/us/apple-patent-nudge-gesture-system,news-21364.html.

Frommer, Troy, "How to Scroll to the Top of Any iPhone App Fast", Published on: Jun. 17, 2012, 5 pages, Available at: http://www.gottabemobile.com/2012/06/17/how-to-scroll-top-any-app-fast/.

* cited by examiner

SCROLL MODE FOR TOUCH/POINTING CONTROL

BACKGROUND

Space limitations on touchscreen devices such as smart phones, tablet computers, and other mobile computing devices are an ongoing problem. Often it is difficult to provide a user with optimal amounts of visual content and to enable simple and efficient operation of a touch based user interface because of the space limitations. Similar situations arise for pointing user interfaces, where a user points at an augmented reality or virtual reality display area, and pointing gestures are used to control the user interface.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computing device is described which has a sensor operable to receive user input associated with a display area. The computing device has a renderer operable to render a content item to the display area, the content item having a length and width. The computing device has a processor operable to detect when the user input comprises a scroll mode action and to trigger, in response to the scroll mode action, a scroll mode in which a dimension of the display area is mapped to the length or the width of the content. The scroll mode action comprises a swipe from an edge of the display area in a direction towards the center of the display area.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Many touch-based user interfaces on computing devices enable a user to make swiping gestures to drag or scroll content across a display. This is useful where the content will not fit onto the display in a single view. Scrolling involves rendering the content on the display so that, where the display is considered as a window onto the content, the window slides over the content in a continuous manner. The amount, direction and speed of the movement of the window is controlled by user input, such as a touch gesture. Where the size or length of the content is much greater than the window size, the user needs to make many gestures to scroll through the whole content. For example, the user places his or her finger on the touchscreen, makes a swipe gesture, removes his or her finger from the touchscreen, re-positions his or her finger on the touch screen to make another swipe gesture, and so on. This is found to be time consuming and cumbersome for the user. Where the user is familiar with the content, and knows he or she wants to reach a particular location within the content, the user needs to make repeated gestures to scroll to the particular location. Where users are operating the touch based user interface for long periods of time, such repeated movements can lead to muscle strain and other physical problems.

Figure 1:
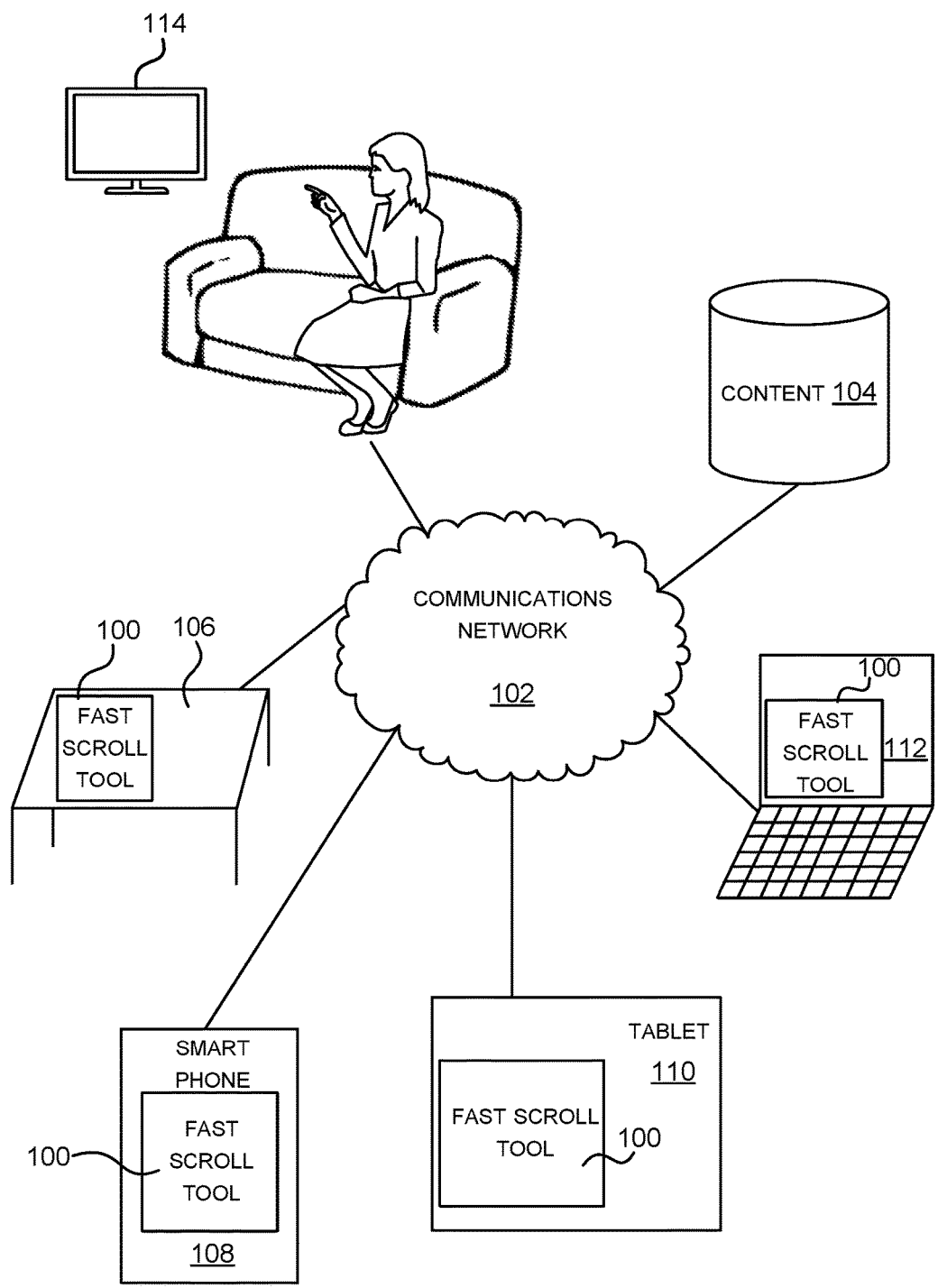
FIG. 1 is a schematic diagram of a fast scroll tool implemented in a plurality of different types of computing device.

In the case of touch-less user interfaces similar issues arise. For example, where a capture device is used to capture and detect detailed hand pose (comprising 3D position and orientation of a plurality of joints of the hand) a touch-less, pointing user interface is able to operate, in a similar manner to a mouse or touch user interface, but using the detected hand pose. An example is illustrated in FIG. 1 which shows a user pointing her finger at a computing device screen to control a graphical user interface, for example, to scroll a list of television programmes. A depth camera mounted on the screen is used to capture data for computing the finger pointing in fine detail. The present technology is therefore applicable to both touch based and touch-less user interfaces.

A head mounted camera, such as in an augmented reality or virtual reality computing device, is used in some examples to capture the pointing data. The computing device displays the content (by projecting it into the user's eye or onto a see-through or virtual reality display) such that it appears to the user to be on a surface in the real or virtual environment, such as the sitting room wall. In this case the user is able to operate his or her hand to scroll content displayed on the sitting room wall. The display area in this case is a virtual reality or augmented reality surface.

FIG. 1 is a schematic diagram of a plurality of computing devices including a table top multi touch computing device 106, a smart phone 108 with a touch screen, a tablet computer 110, a laptop computer with a touch screen 112 and a large screen computing device 114. Each of the computing devices has a fast scroll tool 100 which enables a user to quickly scroll through a content item once the computing device has entered a scroll mode, without the need to make repeated swipe gestures. The computing devices of FIG. 1 are examples only and other types of computing device incorporate the fast scroll tool in some examples, for example wearable computing devices including head mounted computing devices, desk top computing devices and others.

Content items are accessed by the computing devices from content stores 104 over a communications network 102 such as the internet or other wired or wireless communications network. The content items are stored at the computing devices themselves in some examples and in some cases are created at the computing devices. A content item is any document, file, blog, email, web site, file list, email list, content item list, image, video, audio file or other content item. A content item has a length and a width relative to a display area associated with the computing device as explained in more detail below. In some examples the display area corresponds to a touchscreen of a touchscreen device such as the multi touch computing device 106, the smart phone 100, the tablet computer 110 and the laptop computer 112. In some examples the display area is an area on a surface in augmented reality or virtual reality. In some examples the display area corresponds to an area of a display screen which is controlled using a touch less user interface.

Figure 2:
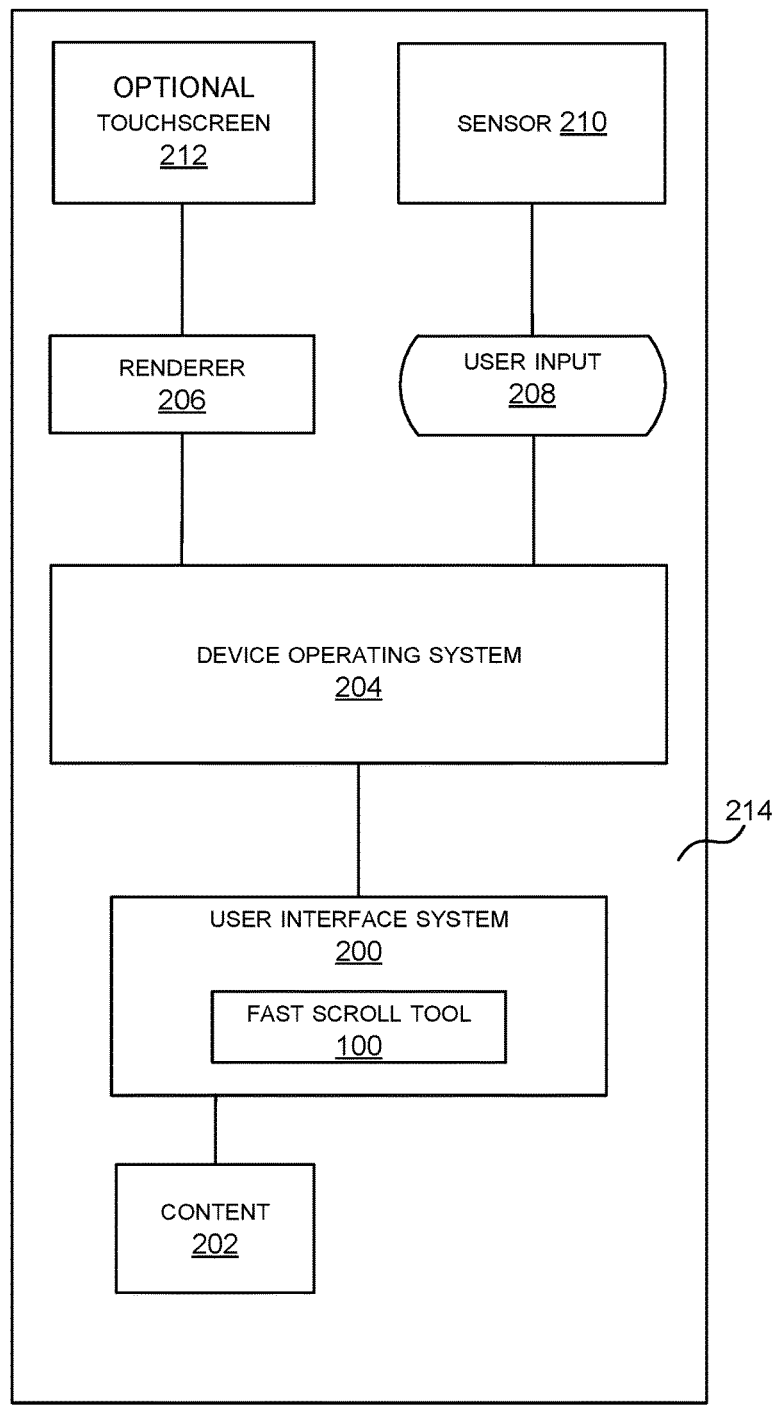
FIG. 2 is a schematic diagram of a computing device with a fast scroll tool.

FIG. 2 is a schematic diagram of a computing device 214 with a fast scroll tool 100 such as any of the computing devices of FIG. 1. The computing device has a sensor 210 to sense user input 208 such as touch gestures on a touchscreen or detailed 3D hand pose (comprising position and orientation of a plurality of joints of the hand). For example, the sensor 210 is a touchscreen sensor or a camera. Other types of sensor are also possible. In examples where the sensor is a camera and detailed 3D hand pose is detected, the computing device comprises a hand pose tracker (see FIG. 8) which computes 3D position and orientation of a plurality of joints of the user's hand from the camera images. This is achieved by fitting a 3D model of a hand to the captured camera data using any of a variety of model fitting techniques available. The camera images are depth images and/or color images. From the 3D hand pose, a pointing location is calculated with respect to a display area such as a physical display, an augmented reality display area or a virtual reality display area.

The computing device has an operating system 204 which receives the user input 208 in the form of sensor data, interprets it and forwards the interpreted user input 208 to a user interface system 200 having a fast scroll tool 100. The user interface system has access to content 202 stored at the computing device 214 such as any of the types of content mentioned above. The user interface system 200 instructs renderer 206 via operating system 204 to render various parts of the stored content 202 according to information from the fast scroll tool 100. The renderer renders the content at a display area associated with the computing device 214, such as a touchscreen 212 (where the device has a touchscreen) or a virtual or augmented reality surface.

The computing device 214 comprises various other components which are not included in FIG. 2 for clarity and which are explained below with reference to FIG. 8. For example, one or more processors, a communications interface and other components.

Alternatively, or in addition, the functionality described with reference to FIG. 2 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
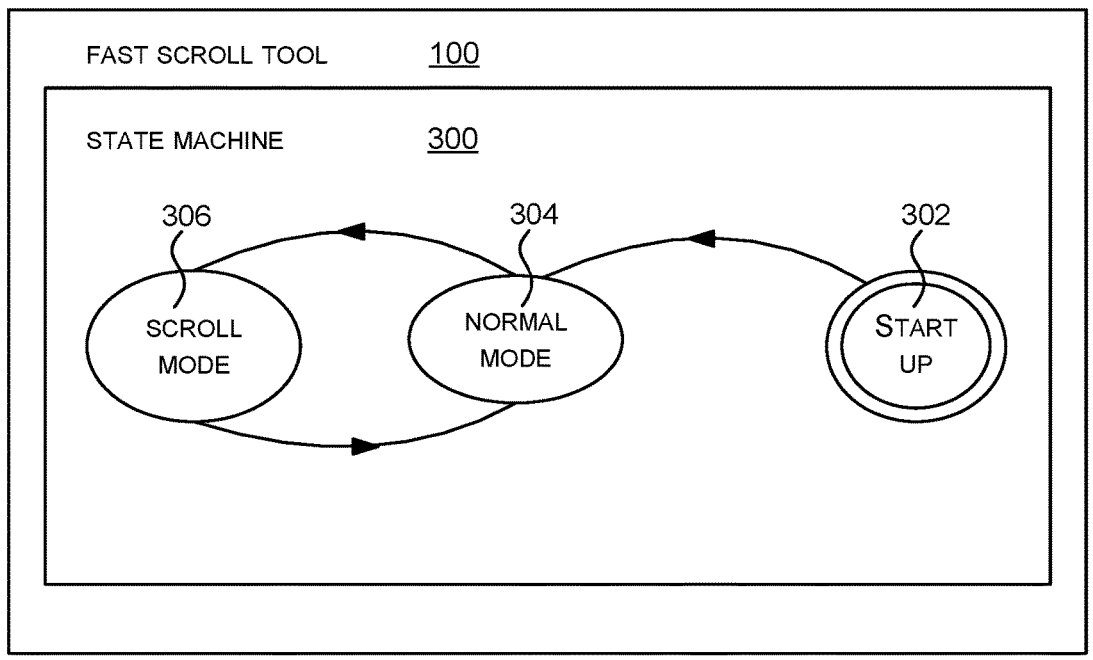
FIG. 3 is a schematic diagram of a fast scroll tool such as that of FIG. 2 in more detail.

The fast scroll tool 100 comprises a state machine 300 as now described with reference to FIG. 3. The state machine comprises a plurality of states indicated as circles in FIG. 3 and where an initial state is indicated by a double circle 302 occurring on start-up of the computing device. Transitions between states are indicated by arrows linking the circles. The state machine ensures that the fast scroll tool 100 is in one of the states of state machine 300 at any one time during operation, and controls the conditions under which transitions between states occur. The state machine of FIG. 3 has three states 302, 304, 306 although additional states may be added without affecting the operation of the scroll mode 306. For example, states concerned with operation of the device for purposes that do not involve scrolling may be added, connected to the normal mode 304.

After start-up, when the device is in start-up mode 302 it transitions automatically to normal mode 304 once start-up is complete. In normal mode a user is able to scroll content at the display area by making repeated swipe gestures as described above. In normal mode the moving position of the user's finger or thumb (during a swipe gesture) in the display area is used to drag the currently displayed content. The word "finger" is used herein to refer to either a finger or a thumb. In some examples, the user is able to hold a pen, wand, stylus or similar in his or her hand and use that to make the pointing gestures or touch inputs.

If the fast scroll tool 100 receives an indication from the operating system that a scroll mode action has been detected, the state machine transitions from normal mode 304 to scroll mode 306. More detail about the scroll mode action and how it is detected is given with respect to FIG. 5 below.

Once in scroll mode 306 the state machine transitions back to normal mode 304 if specified conditions are met. For example, if no pointing or touching is detected.

Figure 4:
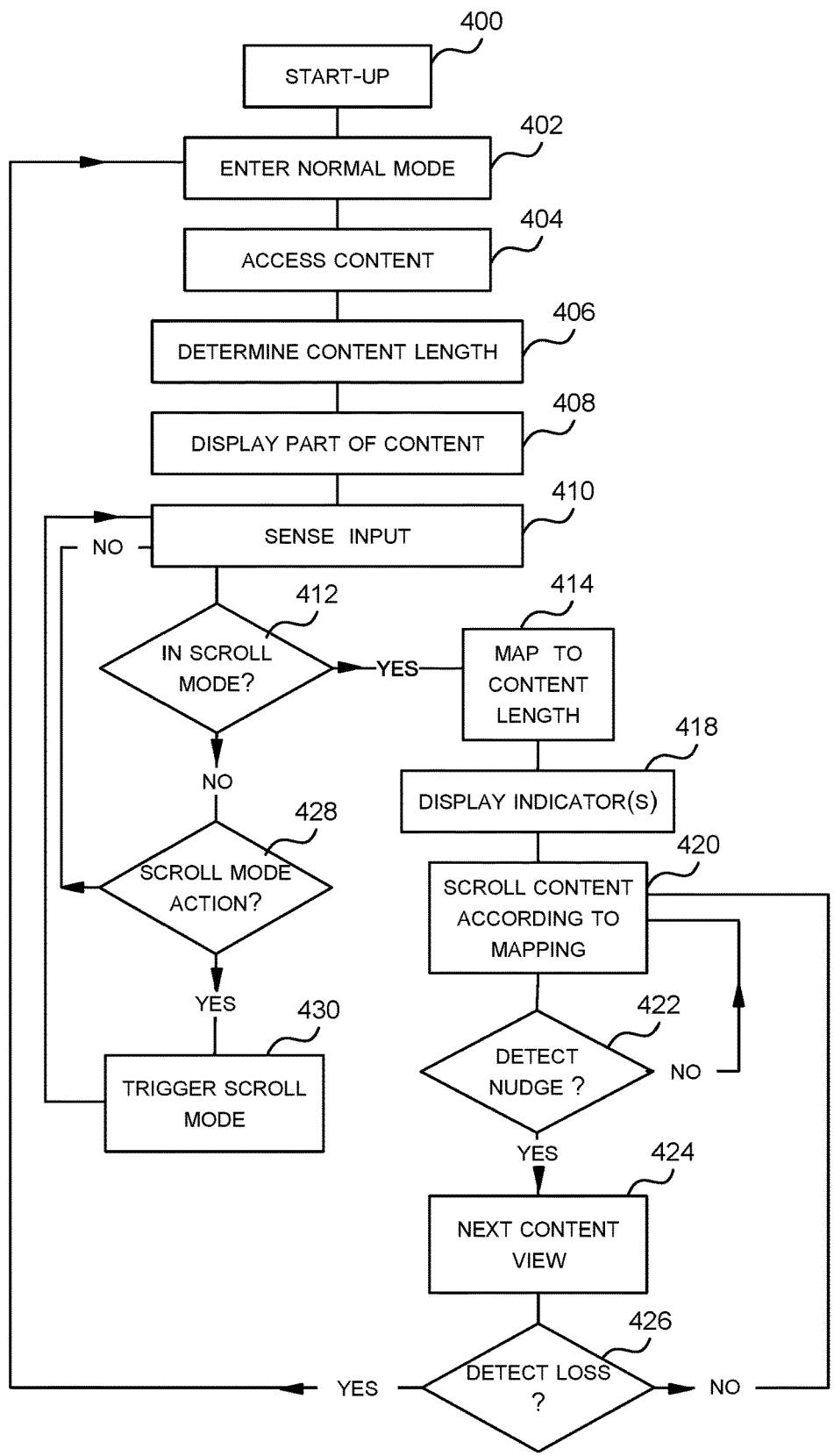
FIG. 4 is a flow diagram of a method of operation of a fast scroll tool.

FIG. 4 is a flow diagram of an example method of operation at a fast scroll tool 100. On start-up 400 of a computing device with a fast scroll tool 100, the state machine enters a normal mode 402 as mentioned above. The computing device accesses a content item 404 as a result of user input, for example, from a local cache at the computing device or from a remote store via a communications network. The fast scroll tool determines 406 a length and/or width of the content item. For example, the fast scroll tool examines a manifest associated with the content, or a content item header, or content item metadata associated with the content item. In some examples, the fast scroll tool examines the content item itself and actively measures a length and/or width of the content item. The length or width is expressed in any suitable unit of measurement and in some examples, is a relative measurement with no units. For example, the length or width is expressed as a proportion of a dimension of the display area, where a dimension of the display area is a length or a width of the display area.

The fast scroll tool instructs the renderer to display 408 part, but not all, of the content at the display area. For example, the content comprises a list of emails in an inbox, or a list of applications on a mobile phone, and the renderer displays only part of the list at the display area due to space restrictions.

Sensed input 410 is received at the fast scroll tool via the operating system. The fast scroll tool checks 412 if it is in scroll mode. If not, it checks 428 if the sensed input is a scroll mode action as described in more detail with reference to FIG. 5. If not it returns to the operation of sensing input 410. If there is a scroll mode action detected the fast scroll tool triggers 430 scroll mode and moves the state machine into scroll mode. It then continues to sense input using operation 410.

At operation 410 in which sensed input is received at the fast scroll tool via the operating system, the fast scroll tool checks 412 if it is in scroll mode. If it is in scroll mode, it maps 414 a dimension of the display area to the content length or width. For example, it maps a length of the display area to the length of the content so that the vertical position of the user's touch/point in the display area indicates a vertical position in the list of applications (or other content).

In some, but not all examples, the fast scroll tool instructs the renderer to display indicators 418 indicating that scroll mode is active. Any suitable indicators are used including any one or more of visual indicators, auditory indicators, tactile indicators. An example of visual indicators is given with respect to FIG. 5 below. In some examples the fast scroll tool instructs the renderer to display scroll status indicators. These are visual, auditory or tactile indicators of the extent of the content which has been scrolled. For example, the scroll status indicators comprise one or more of: line numbers, page numbers, percentage of document scrolled values.

In some, but not all examples, the fast scroll tool implements a check in case the user has entered scroll mode by mistake. For example, suppose the user accidentally makes a scroll mode action then, in examples where a "dead zone" is implemented, scrolling does not actually occur until the user keeps his or her finger on the screen and begins deliberately scrolling. A "dead zone" is a region of around half a thumb's width around the path of the scroll mode action gesture. Where the user's finger is in, or pointing in, the dead zone, scrolling does not occur until the user's finger moves out of the dead zone in a deliberate scrolling action. Use of the dead zone ensures that tiny movements of the finger will not affect the current position of the content. Within the dead zone, the user is able to release scroll mode by taking their finger off the screen as they would normally do to exit scroll mode. By doing so, and not deliberately scrolling or nudging, the position of the content does not change.

In scroll mode, and where any applicable checks have been passed indicating the scroll mode is intentional, the fast scroll tool scrolls 420 the content by instructing the renderer via the operating system. The instructions specify to scroll the content according to the mapping so that the position of the user's touch or point in the display area indicates a position with respect to the whole of the content item, rather than the part of the content item currently shown in the display area. In scroll mode, the portion of the content currently displayed maps directly to the finger's position (pointing or touch).

If the fast scroll tool detects a nudge gesture at check 422 it instructs the renderer to display 424 a next content view, such as a next page of the content.

If the fast scroll tool detects an absence or loss 426 of a pointing or touch user input associated with the display area it moves back to normal mode 402. Otherwise it continues with operation 420 whereby content is scrolled according to the mapping and the user input.

In some examples, the method of FIG. 4 further includes process to actively exit scroll mode and return to normal mode with the content displayed in the display area as it was immediately before the scroll mode was triggered at operation 430, or as it was immediately before the scroll mode was exited. For example, a check is implemented during scroll mode to check for user input of a particular type, which triggers transition to normal mode with content displayed in the display area as it was immediately before the scroll mode was entered, or as it was immediately before the scroll mode was exited. The particular type of user input comprises motion of a finger (pointing or touch) in the reverse of the scroll mode action 428.

Figure 5:
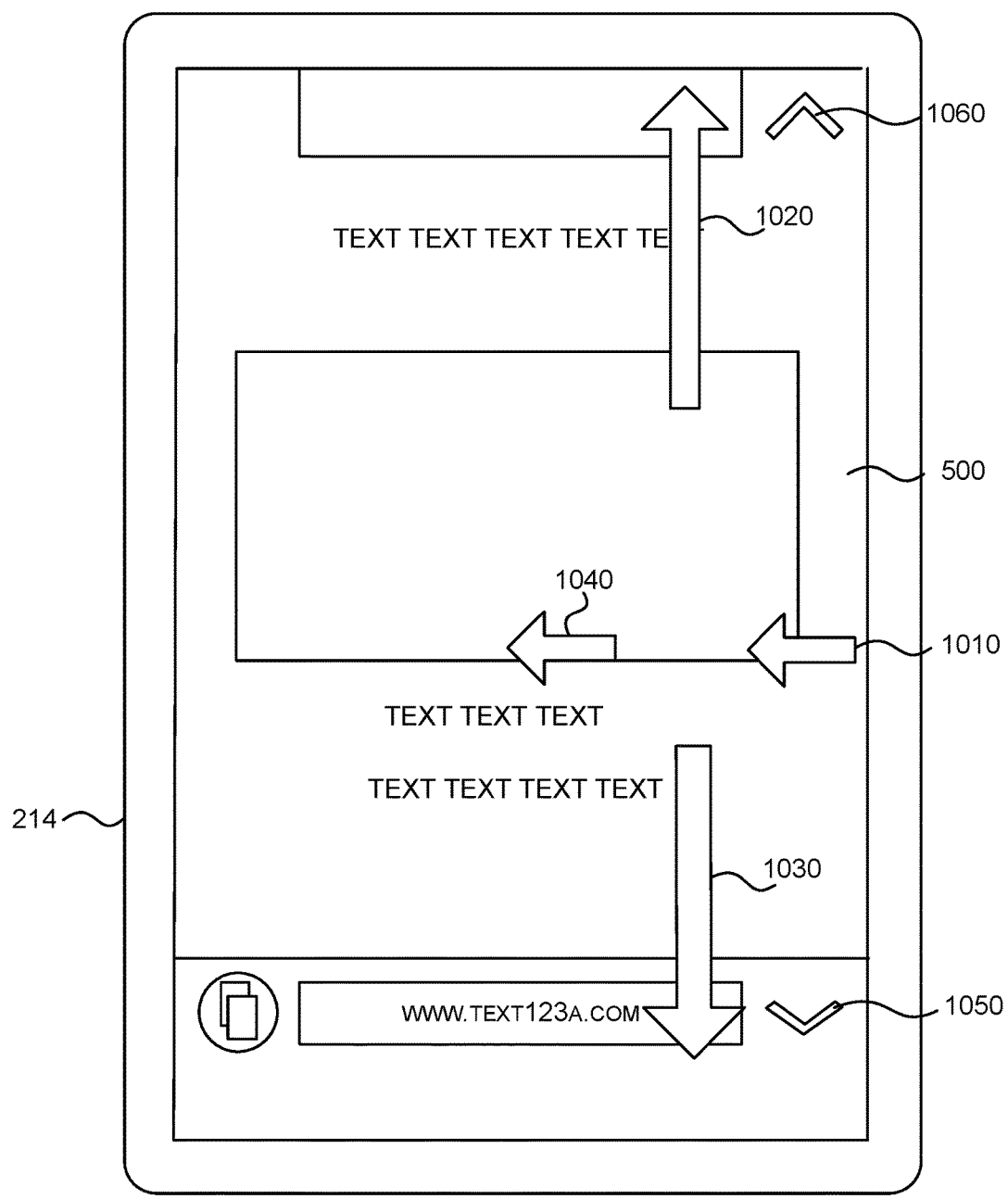
FIG. 5 is a plan view of a touchscreen mobile phone with arrows indicating a scroll mode action.

FIG. 5 is a schematic diagram of a display area 500 which in this example is a touchscreen of a computing device 214. However, the display area could also be an augmented reality or virtual reality display area. In this example the display area is currently displaying text and images where the images are indicated schematically as rectangles and the text is indicated by the word "text" in the figure. The display area is currently displaying scroll mode indicators 1060, 1050 in the form of chevrons or arrow heads. These scroll mode indicators 1060, 1050 are not part of the content and are superimposed on the content or displayed in regions where content does not appear.

In this example, a user of the computing device is operating a browser to browse the content and an address of a web site being browsed is indicated in a search box at the bottom of the display area. This search box and any associated graphical user interface items are not part of the content. In FIG. 5 arrows 1010, 1020, 1030, 1040 represent pointing or touch input of a user and these arrows are not part of the content being displayed.

To make a scroll mode action, a user makes a pointing or touch input beginning at an edge of the display area and moving towards a center of the display area. For example, as indicated by arrow 1010. In examples, the pointing or touch input is a swipe which begins at a perimeter, or circumference of the display area and moves towards a center of the display. In some examples where a touchscreen is used, the swipe begins from an outermost pixel of the touchscreen. The scroll mode action does not cause dragging of content in the display area, as is the case for a swipe during normal mode. This is because the fast scroll tool detects the scroll mode action and transitions to scroll mode. In examples the swipe of the scroll mode action is in a direction which is perpendicular to the direction of scroll. The direction of scroll is parallel to an axis of the display area, where the display area is rectangular.

Suppose the scroll mode is entered and the scroll mode indicators 1050, 1060 displayed as indicated in FIG. 5. The user is now able, whilst keeping the pointing or touch input continuous, to move the pointing or touch input to cause fast scrolling. For example, as indicated by arrow 1020 or by arrow 1030 in FIG. 5. If the user moves the pointing or touch input as for arrow 1020 the content scrolls upwards. If the user moves the pointing or touch input as for arrow 1030 the content scrolls downwards. The vertical position of the touch or pointing input on the display area indicates the position in the content as a whole which is displayed. If the user stops the pointing or touch input the scroll mode exits and normal mode is entered.

In some examples the pointing or touch input of the scroll mode action does not reach the center of the display area, and reaches between 10% to 90% of the distance from the starting point on the edge of the display area to the center of the display area. In some examples, if the fast scroll tool detects the pointing or touch input reaching the center of the display (as indicated by arrow 1040) or travelling more than 90% of the distance between the edge and the center, then the scroll mode action is not detected and the scroll mode is not entered. In this case normal mode continues so that the content on the display area is dragged.

In the case that a reverse scroll mode action is made, to cancel scroll mode, the user makes a pointing or touch input, for example, in a direction perpendicular to the scroll direction and towards the edge of the display area.

Figure 6:
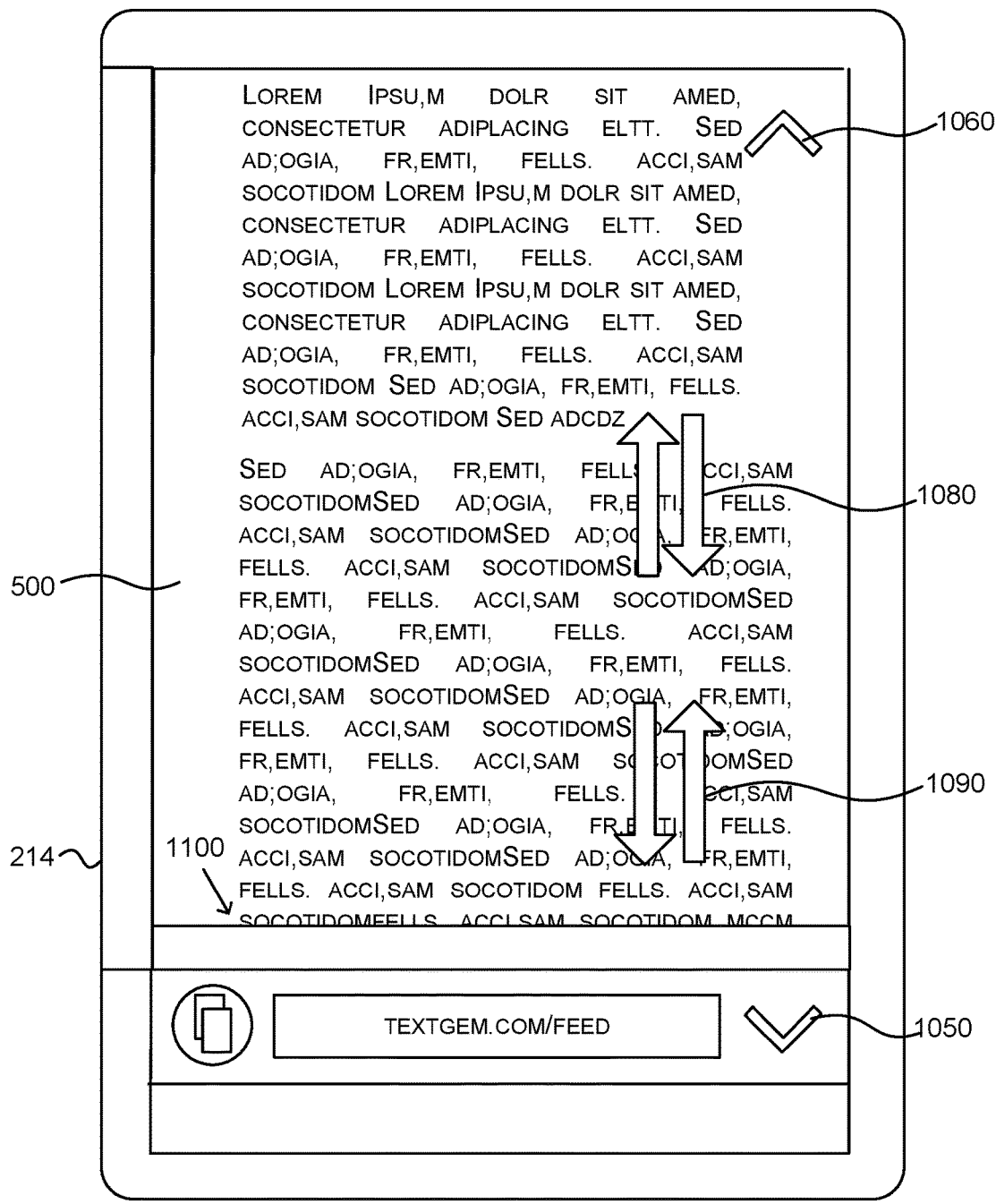
FIG. 6 is a plan view of the touchscreen mobile phone of FIG. 5 with arrows indicating nudge actions.

FIG. 6 is a schematic diagram of a display area 500 which in this example is a touchscreen of a computing device 214. However, the display area could also be an augmented reality or virtual reality display area. In this example the display area is currently displaying text received from a web site. Scroll mode is current as indicated by scroll mode indicators 1050, 1060. A user is able to make an upward nudge gesture or a downward nudge gesture by continuing with the touch or pointing user input of the scroll mode action. The upward nudge gesture is indicated by arrows 1080 and the downward nudge gesture is indicated by arrows 1090. Arrows 1080 and arrows 1090 are not part of the content displayed in the display area and are shown to indicate the nudge gestures.

Each nudge gesture is a continuous pointing or touch input which travels in a first direction (according to how the user wishes to nudge the content) and doubles back on itself. Each nudge gesture is approximately perpendicular to the scroll mode action in some examples.

In the example of FIG. 6 the display area is displaying text and the bottom line of text 1100 is partially visible due to space restrictions of the display area. The use of the nudge gesture 1080 causes a next page of the content item to be displayed in such a manner that any partially displayed text characters on the current page, and which are associated with the next page, appear as complete text characters on the next page. So line 1100 appears as a complete line of text characters as indicated in FIG. 7.

Figure 7:
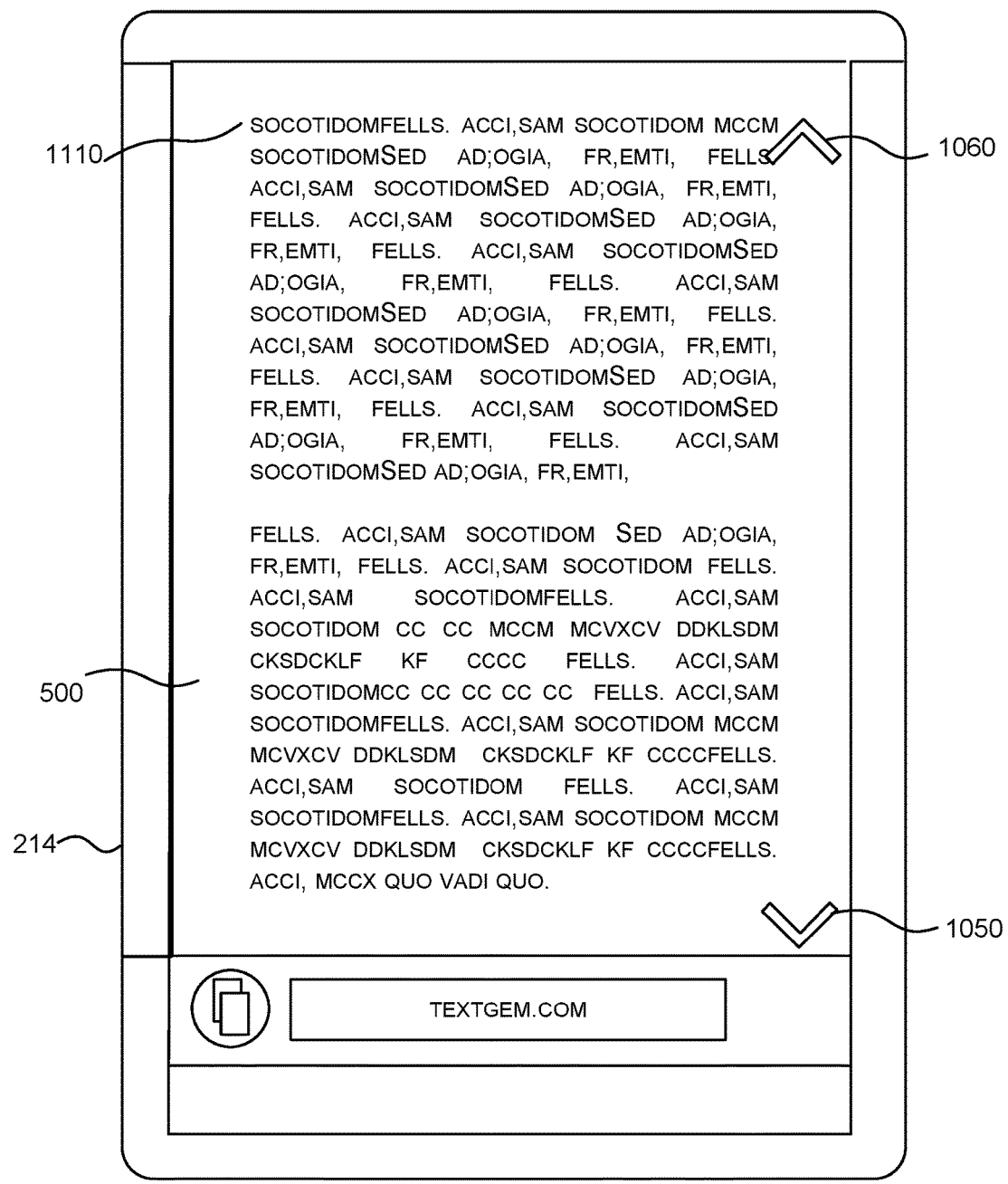
FIG. 7 is a plan view of the touchscreen mobile phone of FIG. 6 after completion of a nudge action.

FIG. 7 is a schematic diagram of a display area 500 which in this example is a touchscreen of a computing device 214. However, the display area could also be an augmented reality or virtual reality display area. In this example the display area is currently displaying text as part of the same content item as in FIG. 6. The line 1110 appears as a complete line of text characters as described above.

Figure 8:
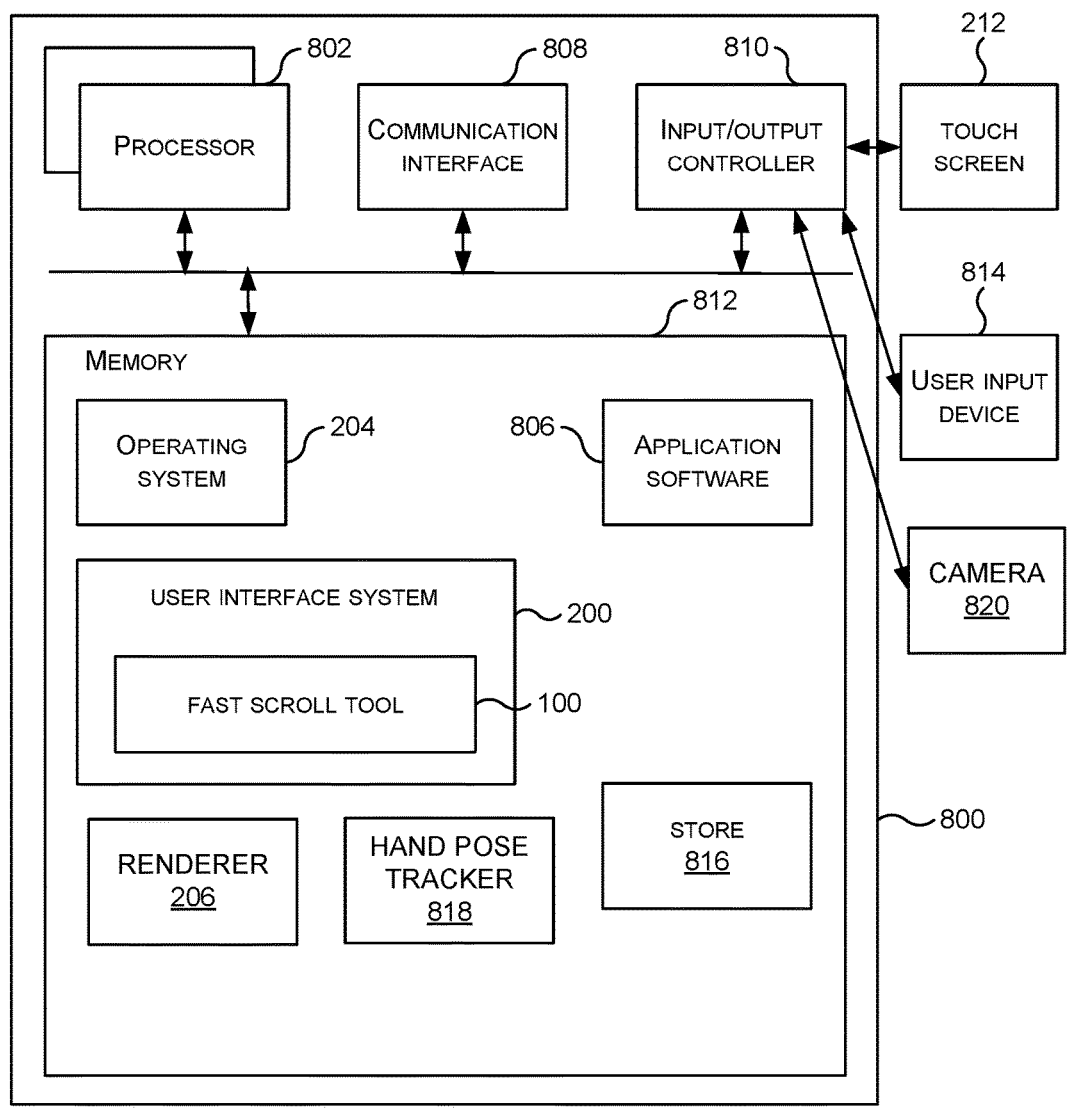
FIG. 8 illustrates an exemplary computing-based device in which embodiments of a computing device with a fast scroll tool are implemented.

FIG. 8 illustrates various components of an exemplary computing-based device 800 which are implemented as any form of a computing and/or electronic device, and in which embodiments of a computing device with a fast scroll tool are implemented in some examples. For example, any of the computing devices of FIG. 1 or other computing devices with fast scroll tools.

Computing-based device 800 comprises one or more processors 802 which are microprocessors, controllers or any other suitable type of processors for processing computer executable instructions to control the operation of the device in order to transition to a scroll mode on detection of a scroll mode action, where the scroll mode action comprises a swipe from an edge of the display area in a direction towards the center of the display area. In some examples, for example where a system on a chip architecture is used, the processors 802 include one or more fixed function blocks (also referred to as accelerators) which implement a part of the method of FIG. 4 in hardware (rather than software or firmware). Platform software comprising an operating system 204 or any other suitable platform software is provided at the computing-based device to enable application software 806 to be executed on the device. A fast scroll tool 100 is provided as part of a user interface system 200. The computing-based device also comprises a renderer 206 configured to render content to a touch screen 212 and/or to an augmented reality or virtual reality display area. The content is stored at store 816 or is accessed via communication interface 808. The computing-based device 800 has a hand pose tracker 818 in some examples, which uses images captured by camera 820 to track detailed hand pose of one or more users.

The computer executable instructions are provided using any computer-readable media that is accessible by computing based device 800. Computer-readable media includes, for example, computer storage media such as memory 812 and communications media. Computer storage media, such as memory 812, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 800 it will be appreciated that the storage is, in some examples, distributed or located remotely and accessed via a network or other communication link (e.g. using communication interface 808).

The computing-based device 800 also comprises an input/output controller 810 arranged to output display information to a display area such as touch screen 212 which may be separate from or integral to the computing-based device 800. In some examples, the display area is an augmented reality or virtual reality display area and the touchscreen 212 is omitted. The display information may provide a graphical user interface. The input/output controller 810 is also arranged to receive and process input from one or more devices, such as a user input device 814 (e.g. a mouse, keyboard, camera, microphone or other sensor). In some examples the user input device 814 detects voice input, user gestures or other user actions and provides a natural user interface (NUI). This user input may be used to control a user interface, make scroll mode actions, specify content sources to be used and for other purposes. In an embodiment the touchscreen 212 acts as the user input device as it is a touch sensitive display device. The input/output controller 810 outputs data to devices other than the display device in some examples, e.g. a locally connected printing device. In examples where there is a pointing user interface, a camera 820 provides input to the input/output controller 810 comprising images depicting a user pointing at the display area. For example, the camera is a color camera, depth camera, video camera, web camera or other camera.

Any of the input/output controller 810, touchscreen 212 and the user input device 814 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computing device, comprising:

a sensor operable to receive user input associated with a display area;

a renderer operable to render a content item to the display area, the content item having a length and width;

a processor operable to detect when the user input comprises a scroll mode action and to trigger, in response to the scroll mode action, a scroll mode in which a dimension of the display area is mapped to the length or the width of the content;

wherein the scroll mode action comprises a swipe from an edge of the display area in a direction towards the center of the display area.

The computing device mentioned above where the processor is operable to transition to the scroll mode from a normal mode in response to the scroll mode action, the normal mode being a mode in which a moving position of the user's finger with respect to the display area is used to drag the currently displayed content.

The computing device mentioned above where the processor is operable to detect the scroll mode action where the swipe begins from a perimeter or circumference of the display area.

The computing device mentioned above where the processor is operable to detect the scroll mode action where the swipe begins from an outermost pixel of a touchscreen computing device.

The computing device mentioned above where the processor is operable to detect the scroll mode action where the swipe does not reach the center of the display area.

The computing device mentioned above where the processor is operable to detect the scroll mode action where the swipe reaches between 10% to 90% of the distance from a starting point on the edge of the display area to the center of the display area.

The computing device mentioned above where the processor is operable, in the scroll mode, to instruct the renderer to scroll the content item so that the position of the user's touch or point with respect to the display area indicates a currently rendered position in the whole content item.

The computing device mentioned above where the processor is operable, such that the scroll mode action does not cause dragging of the content on the display area.

The computing device mentioned above where the processor is operable to transition from scroll mode to a normal mode, when it detects loss of user input, the normal mode being a mode in which a moving position of the user's finger with respect to the display area is used to drag the currently displayed content.

The computing device mentioned above where the processor is operable, during scroll mode, to detect when the user input comprises a nudge forward gesture or a nudge backward gesture, and upon detection of a nudge forward gesture or a nudge backward gesture, to instruct the renderer to render a next page of the content item at the display area.

The computing device mentioned above where the processor is operable to detect one of the nudge gestures upon detection of a touch or pointing movement in a first direction and then doubling back on itself.

The computing device mentioned above where the processor is operable, during scroll mode, to detect a nudge gesture as part of user input continuous with user input of the scroll mode action.

The computing device mentioned above where the processor is operable to detect a nudge gesture as a motion generally perpendicular to a swipe of the scroll mode action.

The computing device mentioned above where the processor is operable to implement a dead zone comprising a region around the scroll mode action in which user input does not cause scrolling.

The computing device mentioned above wherein the processor is operable to exit the scroll mode and display at least part of the content item in the display area as it was immediately prior to triggering of the scroll mode, on the basis of user input.

A computing device, comprising:

a sensor operable to receive user input associated with a display area;

a renderer operable to render a content item to the display area, the content item having a length and width;

a processor operable to detect when the user input comprises a scroll mode action and to trigger, in response to the scroll mode action, a scroll mode in which a position of the user's touch or point with respect to the display area indicates a currently rendered position in the whole content item;

wherein the scroll mode action comprises a swipe from an edge of the display area in a direction towards the center of the display area.

A computer-implemented method comprising:

receiving, from a sensor, user input associated with a display area;

rendering at least part of a content item to the display area, the content item having a length and width;

detecting when the user input comprises a scroll mode action, and triggering, in response to a detected scroll mode action, a scroll mode in which a dimension of the display area is mapped to the length or the width of the content;

wherein the scroll mode action comprises a swipe from an edge of the display area in a direction towards the center of the display area.

The method mentioned above comprising transitioning to the scroll mode from a normal mode in response to the scroll mode action, the normal mode being a mode in which a moving position of the user's finger with respect to the display area is used to drag the currently displayed content.

The method mentioned above comprising detecting the scroll mode action where the swipe begins from a perimeter or circumference of the display area.

The method mentioned above comprising detecting the scroll mode action where the swipe reaches between 10% to 90% of the distance from a starting point on the edge of the display area to the center of the display area.

A computing device comprising:

means for receiving, from a sensor, user input associated with a display area;

means for rendering at least part of a content item to the display area, the content item having a length and width;

means for detecting when the user input comprises a scroll mode action, and triggering, in response to a detected scroll mode action, a scroll mode in which a dimension of the display area is mapped to the length or the width of the content;

wherein the scroll mode action comprises a swipe from an edge of the display area in a direction towards the center of the display area.

The examples illustrated and described herein as well as examples not specifically described herein but within the scope of aspects of the disclosure constitute exemplary means for receiving user input, means for rendering and means for detecting when the user input comprises a scroll mode action. For example, the elements illustrated in FIGS. 2 and 8, such as when encoded to perform the operations illustrated in FIG. 4, constitute exemplary means for receiving user input, detecting when the user input comprises a scroll mode action and means for rendering.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computing device, comprising:
a sensor operable to receive user input associated with a display area;
a renderer operable to render a content item to the display area, the content item having a length and width; and
a processor operable to detect when the user input comprises a scroll mode action and to trigger, in response to the scroll mode action, a scroll mode in which a dimension of the display area is mapped to the length or the width of the content;
wherein the scroll mode action comprises a swipe from an edge of the display area in a direction towards the center of the display area, and the processor is further operable, during the scroll mode, to detect when the user input comprises a nudge forward gesture or a nudge backward gesture, and upon detection of the nudge forward gesture or the nudge backward gesture that includes movement in a first direction and then moving back in a second direction opposite to the first direction, to instruct the renderer to render a next page or a previous page of the content item, respectively, at the display area corresponding to the first direction.

2. The computing device of claim 1 where the processor is operable to transition to the scroll mode from a normal mode in response to the scroll mode action, the normal mode being a mode in which a moving position of the user's finger with respect to the display area is used to drag the currently displayed content.

3. The computing device of claim 1 where the processor is operable to detect the scroll mode action where the swipe begins from a perimeter or circumference of the display area.

4. The computing device of claim 1 where the processor is operable to detect the scroll mode action where the swipe begins from an outermost pixel of a touchscreen computing device.

5. The computing device of claim 1 where the processor is operable to detect the scroll mode action where the swipe does not reach the center of the display area.

6. The computing device of claim 1 where the processor is operable to detect the scroll mode action where the swipe reaches between 10% to 90% of the distance from a starting point on the edge of the display area to the center of the display area.

7. The computing device of claim 1 where the processor is operable, in the scroll mode, to instruct the renderer to scroll the content item so that the position of the user's touch or point with respect to the display area indicates a currently rendered position in the whole content item.

8. The computing device of claim 1 where the processor is operable, such that the scroll mode action does not cause dragging of the content on the display area.

9. The computing device of claim 1 where the processor is operable to transition from scroll mode to a normal mode, when it detects loss of user input, the normal mode being a mode in which a moving position of the user's finger with respect to the display area is used to drag the currently displayed content.

10. The computing device of claim 1 where the nudge forward gesture and the nudge backward gesture causes the next page or the previous page of the content item to be displayed, such that any partially displayed text characters on a current page, and that are associated with a next page, appear as complete text characters on the next page.

11. The computing device of claim 1 where the processor is operable to detect one of the nudge gestures upon detection of a touch or pointing movement in a first direction and then doubling back on itself in the second direction, wherein the nudge forward gesture and the nudge backward gesture each comprise a single motion in the first direction and a single motion in the second direction.

12. The computing device of claim 1 where the processor is operable, during scroll mode, to detect one of the nudge forward gesture or the nudge backward gesture as part of user input continuous with user input of the scroll mode action.

13. The computing device of claim 1 where the processor is operable to detect one of the nudge forward gesture or the nudge backward gesture as a motion generally perpendicular to a swipe of the scroll mode action.

14. The computing device of claim 1 where the processor is operable to implement a dead zone comprising a region around the scroll mode action in which user input does not cause scrolling.

15. The computing device of claim 1 wherein the processor is operable to exit the scroll mode and display at least part of the content item in the display area as it was immediately prior to triggering of the scroll mode, on the basis of user input.

16. A computing device, comprising:

a sensor operable to receive user input associated with a display area;

a renderer operable to render a content item to the display area, the content item having a length and width; and a processor operable to detect when the user input comprises a scroll mode action and to trigger, in response to the scroll mode action, a scroll mode in which a position of the user's touch or point with respect to the display area indicates a currently rendered position in the whole content item;

wherein the scroll mode action comprises a swipe from an edge of the display area in a direction towards the center of the display area, and the processor is further operable, during the scroll mode, to detect when the user input comprises a nudge forward gesture or a nudge backward gesture, and upon detection of the nudge forward gesture or the nudge backward gesture that includes movement in a first direction and then moving back in a second direction opposite to the first direction, to instruct the renderer to render a next page or a previous page of the content item, respectively, at the display area corresponding to the first direction.

17. A computer-implemented method comprising:

receiving, from a sensor, user input associated with a display area;

rendering at least part of a content item to the display area, the content item having a length and width; and detecting, by a processor, when the user input comprises a scroll mode action, and triggering, in response to a detected scroll mode action, a scroll mode in which a dimension of the display area is mapped to the length or the width of the content;

wherein the scroll mode action comprises a swipe from an edge of the display area in a direction towards the center of the display area, and during the scroll mode, detecting when the user input comprises a nudge forward gesture or a nudge backward gesture, and upon detection of the nudge forward gesture or the nudge backward gesture that includes movement in a first direction and then moving back in a second direction opposite to the first direction, rendering a next page or a previous page of the content item, respectively, at the display area corresponding to the first direction.

18. The method of claim 17 comprising transitioning to the scroll mode from a normal mode in response to the scroll mode action, the normal mode being a mode in which a moving position of the user's finger with respect to the display area is used to drag the currently displayed content.

19. The method of claim 17 comprising detecting the scroll mode action where the swipe begins from a perimeter or circumference of the display area.

20. The method of claim 17 comprising detecting the scroll mode action where the swipe reaches between 10% to 90% of the distance from a starting point on the edge of the display area to the center of the display area.

* * * * *